US006963317B2

(12) United States Patent
Zuk et al.

(10) Patent No.: US 6,963,317 B2
(45) Date of Patent: Nov. 8, 2005

(54) RFID TAG WIDE BANDWIDTH LOGARITHMIC SPIRAL ANTENNA METHOD AND SYSTEM

(75) Inventors: Philip C. Zuk, Portland, ME (US); Raymond A. Roberts, Saco, ME (US); John V. Vogt, III, Scarborough, ME (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 10/665,166

(22) Filed: Sep. 18, 2003

(65) Prior Publication Data

US 2004/0056823 A1 Mar. 25, 2004

Related U.S. Application Data

(60) Provisional application No. 60/412,526, filed on Sep. 20, 2002.

(51) Int. Cl.[7] .................................................. H01Q 1/36
(52) U.S. Cl. ............................... 343/895; 343/700 MS; 340/572.7
(58) Field of Search ................................. 343/895, 873, 343/700 MS; 340/572.7, 572.1, 72.5

(56) References Cited

U.S. PATENT DOCUMENTS 5,313,216 A * 5/1994 Wang et al. ......... 343/700 MS
5,621,422 A * 4/1997 Wang .......................... 343/895
6,281,794 B1 * 8/2001 Duan et al. .............. 340/572.1
6,359,444 B1 * 3/2002 Grimes ....................... 324/633

* cited by examiner

*Primary Examiner*—Don Wong
*Assistant Examiner*—Ephrem Alemu
(74) *Attorney, Agent, or Firm*—Cesari and McKenna, LLP; Edwin H. Paul, Esq.

(57) ABSTRACT

A radio frequency identification (RFID) tag antenna system includes a planar two arm logarithmic spiral antenna with a suitably small form factor. There are two arms are of conductive foils or etched copper plating on a substrate the extend outwardly from a center in a logarithmic fashion. The two arms are identical to each other but rotated in the plane by 180 degrees. The arms also grow proportionally in width as they extend outward, but at any given distance from the center the width of both arms are equal to each other and, preferably, equal to the spaces between the arms. An impedance matching network receives the RF signal received by the dual spiral antenna and feed the RF signal to an electronic circuit that rectifies and multiplies the signal to form a DC signal that charges a capacitor. The electronics may be built onto the same substrate as the planar antenna, but preferably, the electronic circuit is built onto a second substrate is mounted, making appropriate electrical connections, to the antenna bearing substrate.

22 Claims, 6 Drawing Sheets

OPERATING FREQUENCY: $F = 915 \times 10^6$ Hz  ANTENNA GAIN: $G = 5$ dB

ANTENNA INPUT
IMPEDANCE: $Z_{in} = 18$

DIE INPUT IMPEDANCE: $Z_{out} = 3000$  $A_v = 10^{\frac{G}{10}}$

QUALITY FACTOR: $Q = \sqrt{\left(\frac{Z_{out}}{Z_{in}}\right) - 1}$  $A_v = 3.162$
TRANSMITTER POWER: $P_t = 1$ W $Q = 12.871$ TRANSFORMATION RATIO: $T_r = \sqrt{\frac{Z_{out}}{Z_{in}}}$  HALF WAVELENGTH  W1 = 0.439 feet
DISTANCE LAG FROM
READER:  $d = 5$ feet $T_r = 12.91$  POWER AT RECEIVE
ANTENNA

MATCHING NETWORK
CALCULATIONS

SERIES INDUCTOR: $X1 = Q \cdot Z_{in}$  POWER $= \left[\frac{(2 \cdot W_1)}{(4 \pi \cdot d)}\right]^2 \cdot P_t \cdot A_v$
$X1 = 231.681$
$L = \frac{X1}{(2 \pi \cdot F)}$  POWER $= 6.175 \times 10^{-4}$ watts VOLTAGE AT RECEIVE
ANTENNA
$\boxed{L = 4.03 \times 10^{-8}}$ H  $V_r = \sqrt{(Z_{in} \cdot \text{Power})}$ PARALLEL CAPACITOR: $X_c = \frac{Z_{out}}{Q}$  $V_r = 0.105$ volts

VOLTAGE USING
TRANSFORMATION RATIO $X_c = 233.079$
$C = \frac{1}{(2 \pi \cdot F \cdot X_c)}$  $V_t = V_r \left(\sqrt{\frac{Z_{out}}{Z_{in}}}\right)$ $V_t = 1.361$ volts
$\boxed{C = 7.463 \times 10^{-13}}$ F VOLTAGE AFTER
VOLTAGE DOUBLER
$V_{in} = 2.8 \cdot V_t - .6$
$\boxed{V_{in} = 3.211}$ volts

FIG. 5

RFID TAG WIDE BANDWIDTH LOGARITHMIC SPIRAL ANTENNA METHOD AND SYSTEM

CROSS-REFERENCE TO RELATED APPLICATIONS

The present application claims the benefit of U.S. Provisional Patent Application Ser. No. 60/412,526, which was filed on Sep. 20, 2002, of common title and inventorship with the present applications, and which application is hereby incorporated herein by reference.

BACKGROUND OF THE INVENTION

1. Field of the Invention

The present invention relates to radio frequency identification (RFID), and more particularly to wide bandwidth spiral antennas, radio frequency (R) transponder tag circuitry and impedance matching networks.

2. Background Information

Radio frequency identification (RFID) is well known using 125 KHz and 13.56 MHz for passive and active transponders, respectively. A passive transponder accepts power from the received signal and returns an identification signal. Active transponders contain a power source and need not be powered from the received signal. Therefore passive transponders require higher signal strength, while active transponders require much less signal strength, but at the cost of a power source.

Another area of concern is the Federal communications commission (FCC) regulates emissions, so prior art designs provide high power at short range but employ canceling techniques to comply with far range FCC regulations.

RFID tag installations now in use have ranges of about thirty inches, that are typically found in retail stores. Circuits with greater range have been investigated, especially transponders in the 900 MHz to 2.50 GHz range. A company named Intermec, sells an expensive 915 MHz tag system.

U.S. Pat. No. 6,118,379 ('379) to Kudukula et al and U.S. Pat. No. 6,285,342 B1 to Brady et al. are two patents in this field.

The '379 patent uses a partial spiral (one arm) with a spaced ground plane and claims maximum range in its abstract. A carrier frequency of 2.45 GHz is discussed but the range appears to be in the range of inches. Moreover, the partial spiral limits bandwidth, which is desired in this patent, and the spaced ground plane adds cost. The '342 patent uses a distorted spiral to gain a larger antenna in a button sized package and also uses a loading bar and stubs to match impedances, but adds complexity and cost, but does not appear to extend the useable range beyond the above mentioned thirty inches.

There is a need for RFID systems for tracking cattle, baggage transponders, car or such vehicle identification, and warehouse tracking. Such systems will require RFID systems with a range in the order of ten feet. There is also a need to meet the requirements of both the United States and Europe for such RFID systems. The U.S. systems operate at 915 MHz and similar Europe systems operate at 869 MHz. To meet both such standards at a range of ten feet, an RFID tag system would need an improved antenna and a relatively wider bandwidth than known prior art systems.

An article in Applied Microwave & Wireless, entitled: "A Logarithmic Spiral antenna for 0.4 to 3.8 GHz," by Jesper Thaysen et al, describes a spiral antenna mounted with a balun and a cavity. This article presents some technical discussion relevant to the general field of spiral antennas and is hereby incorporated herein by reference. The article is silent on applications. From FIG. 1 in the article, a co-ax connector is shown relative to the spiral arms. From this figure and assuming that co-ax is about ⅓ to ½ inches wide, the distance between the most distant points on the spiral arms is estimated to be at least 16 inches. Clearly this antenna is not suited for RFID applications.

It is an objective of the present invention to provide a longer range, more than ten feet, RFID tag system with the small tag form factor that meets the requirements of Europe and the U.S.

SUMMARY OF THE INVENTION

In view of the foregoing background discussion, the present invention provides an RFID tag antenna system with two symmetrical placed identical planar anus arranged in a spiral where the width of the arms grow as the arms radiate away from a center. The growth of the arms, preferably, provide for equal widths and spaces at equal distances from the center. The growth of the widths of the arms is arranged by defining an inner and an outer radial spiral according to logarithmic functions.

The antenna system is preferably flexibly arranged to fit within a tag form factor that is determined from the application.

In a preferred embodiment, there is an impedance matching network that is packaged on the same substrate as the planar spiral antenna. An input circuit is preferably provided on a separate substrate that is joined to the antenna bearing substrate forming a sandwich package that maintains the tag form factor. Rectify Schottky diodes form part of the input circuit to form a DC signal. The input circuit, in a preferred embodiment, may include a capacitor built into the die as is known in the art (say a reversed biased diode) to store charge from the DC signal when the RF signal is strong. The charge on such a capacitor can be used so that the tag circuit will respond when the input RF signal is lower.

Typically, the presence of the tag is sensed by noting the increased power supplied by an RF sending or interrogating station.

Preferably the antenna arms are formed by etched copper runs on a substrate, and/or by using conductive paints or other conductive metals, like silver, aluminum or solder. The arms define a center where the two arms define a gap, the closest point to each other. The matching network is connected at this gap to the antenna arms.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which:

FIG. 5 are the calculations for a preferred embodiment; and

DETAILED DESCRIPTION OF AN ILLUSTRATIVE EMBODIMENT

Figure 1:
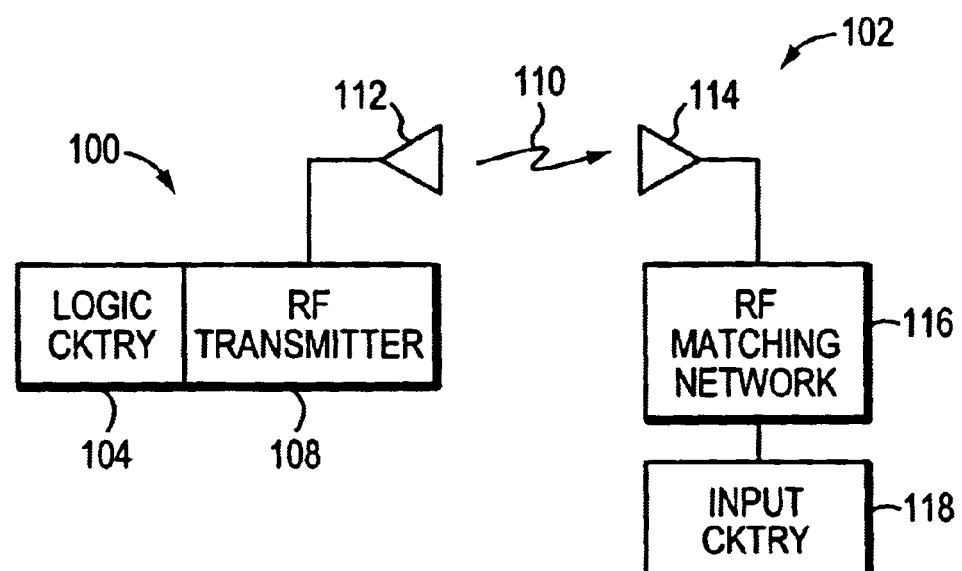
FIG. 1 is a system block diagram of an RFID tag system.

FIG. 1 is a basic block diagram of an illustrative RFID tag system. Here an interrogation station 100 generates an RF signal 108, usually a pulse signal generated by the logic circuit 104, that is transmitted 110 via an antenna 112 to a tag system 102. The RF pulse is received via an antenna 114 and an RF impedance matching circuit 116 as is known in the art, and, an input circuit 118. If the RF signal is strong enough, the input circuitry rectifies the RF signal and charges a capacitor that is used to power the tag system when the RF signal is low. As is known in the art, the tag circuit presents a load to the RF transmitter causing the RF transmitter power to increase in the presence of a tag. In one embodiment, as known in the art, the driving RF voltage signal is stepped up. That increase may be sensed by the logic circuitry 104 to indicate the presence of the tag. Other known techniques may used to generate and detect a tag.

Figure 2:
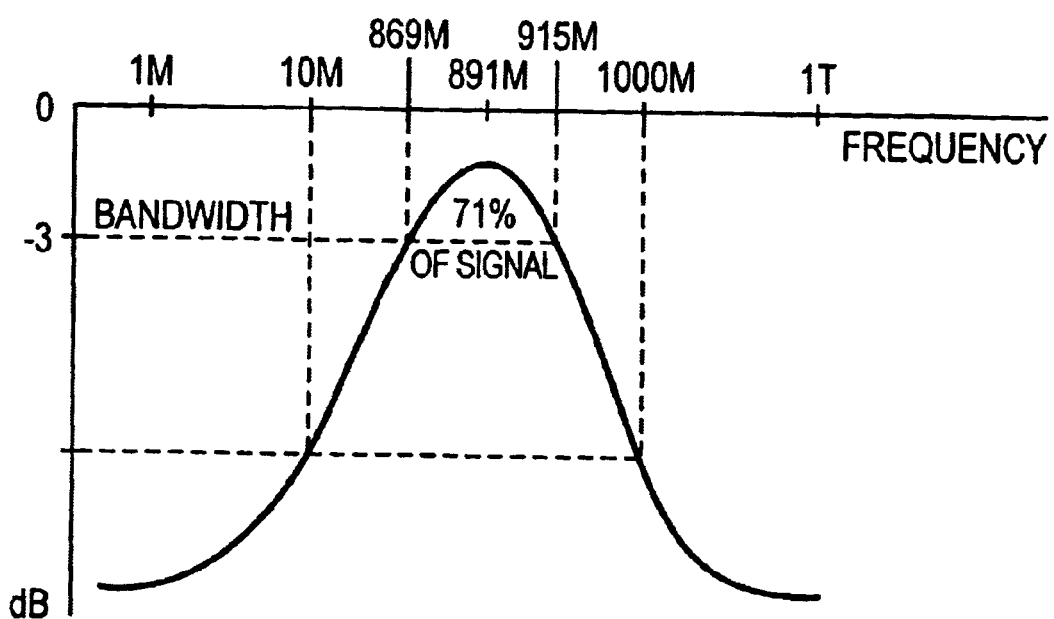
FIG. 2 is a frequency chart of a preferred embodiment for a transponder suitable for being read in Europe and in the U.S.

FIG. 2 shows a frequency response for a transponder suitable for operating in Europe and in the U.S. The 915 MHz representing the U.S. frequency of choice and the 869 MHz Europe's. At these frequencies the U.S. allows a maximum of 1 watt power output from the reader while Europe's maximum is 0.5 watt at 869 MHz.

The antenna, by inspection of FIG. 2, to meet these two requirements requires a bandwidth of 47 MHz with a Q of 19. Such a system may be deployed, but is not limited thereto, in a luggage tag system that passes both U.S. and European standards.

Figure 3:
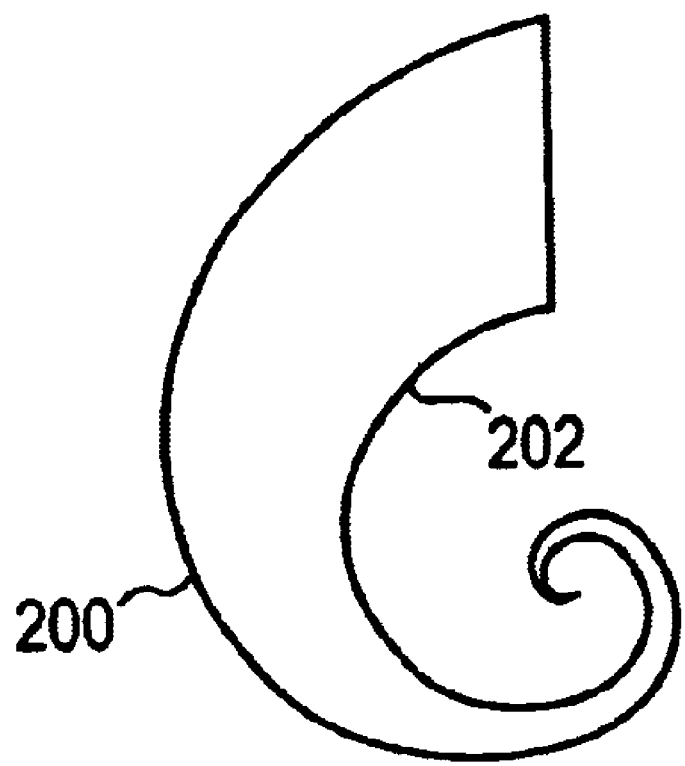
FIG. 3 is a graph of one leg of a preferred spiral antenna.

FIG. 3 shows one arm of a spiral antenna with the outer spiral radius r1 200 created in accordance with $r1=r0e^{a\theta}$ and the inner spiral radius r2 202 created on accordance with $r2=r0e^{\theta-\theta0}$. Here r0 represents an initial position, θ angular position, θ0 the angular offset between r1 and r2, and "a" growth rate.

Figure 4:
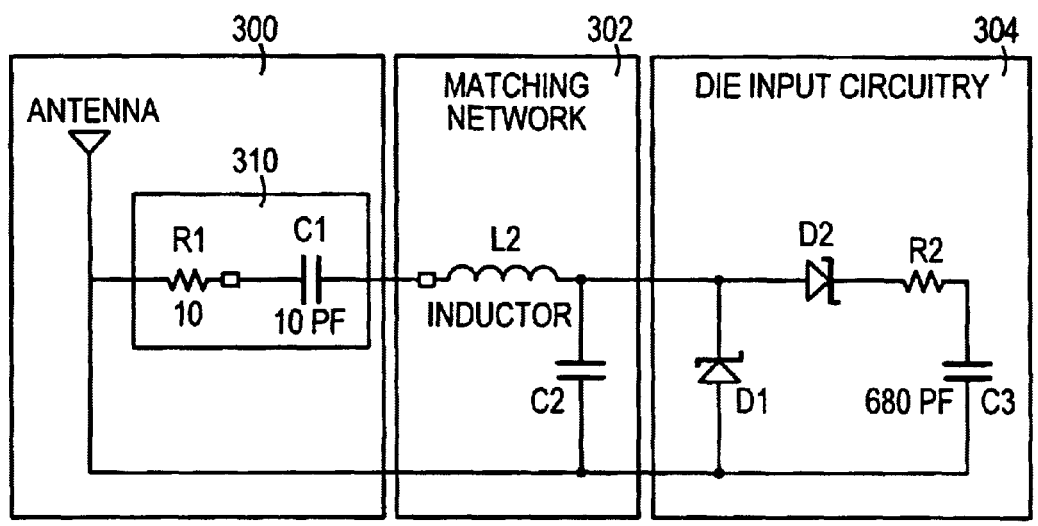
FIG. 4 is a circuit diagram of the impedance matching network of a passive transponder.

A second arm (shown in FIG. 6) can be created by rotating the one arm by 180 degrees in the plane of the one arm. A small gap is left between the two spiral arms at their starting points. Impedance matching circuitry of FIG. 4 is applied to this gap. To achieve frequency independence, of the antenna the widths of the arms are made equal to the spacing between the arms as the arms radiate and grow outward.

FIG. 4 illustrates one example of an antenna 300 measured with an impedance of 16-j10 at 915 MHz and an impedance matching circuit network 302. The resistor R1 and capacitor C1 represent the impedance of the antenna not actual components. The matching circuit network 302 nulls out the capacitive reactance of the antenna impedance. The resistive element is stepped up by the 3 K ohm resistor at the input circuitry side and used for charging the capacitor C3. The die input circuitry 304 includes two Schottky diodes, resistor R2, and a capacitor C3. Diode D1 clamps the voltage negatively with D2 operating as a peak detector in the forward direction to provide a DC voltage/current to charge up the capacitor C3. The charged capacitor powers the device when receiving low amplitude pulses from the reader, for example when the reader is distant.

The die input circuitry 304 is so called since in a preferred embodiment it is packaged on a separate die that is mounted onto a substrate carrying the antenna and the matching network.

FIG. 5 shows the applicable calculations for a specific preferred embodiment of the RFID tag system operating at 915 MHz.

Figure 6A:
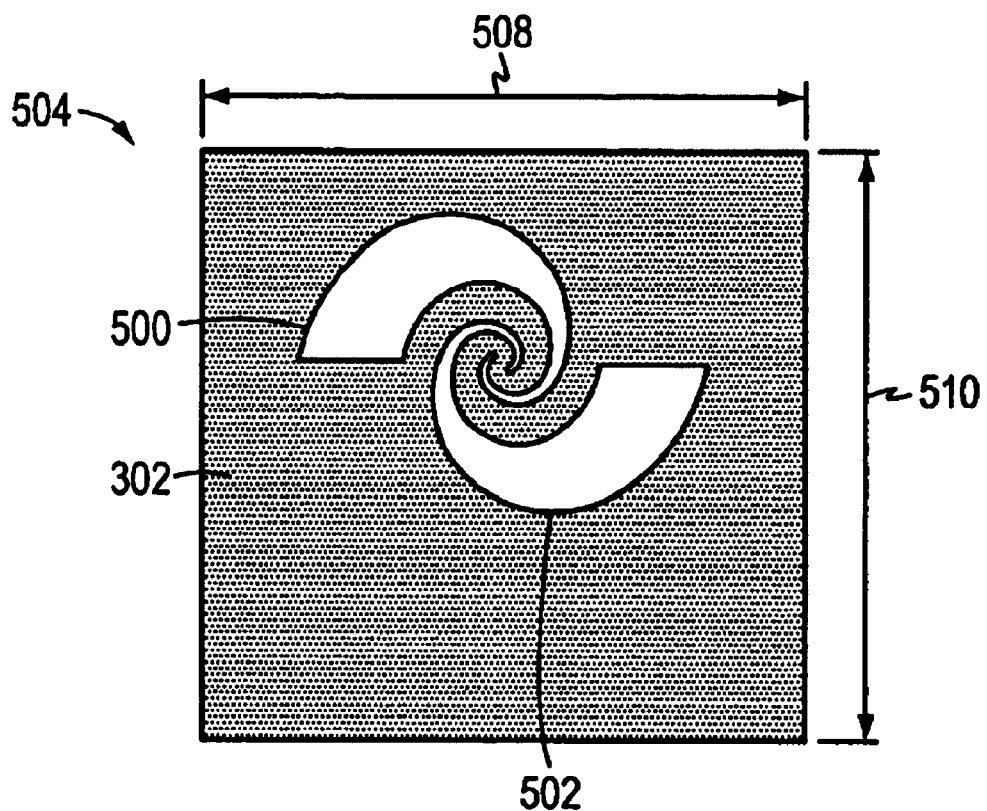
FIGS. 6A and 6B are illustrations of a full spiral antenna, matching network and input circuitry built in accordance with the present invention.

FIG. 6A shows a preferred embodiment of a substrate of the present invention spiral antenna arms 500, 502. The spiral arms are built using 2 mil copper tape and conductive paint on a 5 mil thick polyimide substrate 504. The substrate is about 59 mm or 2.32 inches wide by 40 mm or 1.57 inches. The two symmetrical arms are shown 500 and 502, and the matching circuit network 302 is built on the substrate. The die input circuitry 304 is attached, see FIG. 6B, by raised solder balls, like in a ball grid array IC package. Of course other attachment methods may be used including building the die input circuitry onto the antenna substrate. In one preferred example, the capacitor C3 of FIG. 4 operating at 915 MHz builds a charge to 3.9 volts. The read distance using a linearly polarized reader RF signal is twelve feet, and six feet with a circularly polarized reader RF signal.

In the preferred embodiment illustrated in FIG. 6A, the linear dimensions of the spiral antenna itself is less than about 2.3 inches wide 508 by less than about 0.8 inches high 510.

Figure 6B:
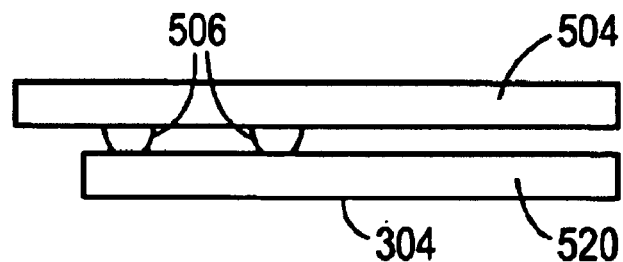

FIG. 6B illustrates a preferred embodiment where a second substrate 520 carrying the die input circuitry 304 makes electrical connections to the matching network via the nodes or ball 506.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. An RFID tag antenna system suitable for detecting the presence of an RF signal transmitted by an RF generator, the RFID tag antenna system comprising:

a planar two arm spiral structure arranged to receive the RF signal, the two arms electrically isolated from each other but arranged defining a gap between the two arms, the planar two arm spiral structure having a frequency response from about 870 MHz to 920 MHz, an electronic circuit electrically connected to the arms straddling the gap and arranged to receive the RF signal from the planar two arm spiral antenna, and means for sensing the receipt of the RF signal by the electronic circuit by sensing a power increase in the RF generator in the presence of the planar two arm spiral structure.

2. The RFID tag antenna system of claim 1 wherein the each arm of the planar two arm spiral structure is identical to the other except one is rotated the plane by 180 degrees from the other.

3. The RFID tag antenna system of claim 1 wherein a center is defined at the middle of the gap, and wherein each arm of the planar two spiral structure defines an inner radial spiral and an outer radial spiral arranged so that the width of each arm grows as the arms radiate farther from the center.

4. The RFID tag antenna system of claim 3 wherein the inner and outer radial spirals adhere to a logarithmic function.

5. The RFID tag antenna system as defined in claim 3 wherein at any point equidistant from the center the widths of each arm are equal to each other and equal to the spaces between each arm.

6. The RFID tag antenna system of claim 1 wherein a lateral dimensions of the planar two spiral arm structure are less than about five inches by less than about two inches.

7. The RFID tag antenna system of claim 1 wherein a lateral dimensions of the planar two spiral arm structure are less than about two inches by less than about one inches.

8. The RFID tag antenna system of claim 1 wherein each arm of the planar two arm spiral structure comprises a thin conductive layer built onto a substrate.

9. The RFID tag antenna system of claim 1 wherein the electronic circuit comprises:

a network that matches the spiral antenna electrical impedance and that receives the RF signal from the planar two arm spiral antenna and provides an RF output signal, and an input circuit that receives and rectifies the output RF signal forming a DC signal, the input circuit including a capacitor the stores energy from the DC signal.

10. The RFID tag antenna system of claim 9 wherein each arm of the planar two arm spiral structure comprises a thin conductive layer built onto a substrate, and further wherein the matching and the input circuits are built onto the substrate.

11. The RFID tag antenna system of claim 10 further comprising a second substrate is mounted to the first substrate where the input circuitry built onto the second substrate and electrical connections are made from the matching network and the input circuit.

12. A method for detecting an RF transmitted by an RF generator, as part of an RFID tag system, the method comprising the steps of:

arranging a planar two arm spiral structure to receive the RF signal, defining a gap between the two electrically isolated arms, wherein the planar two arm spiral structure has a frequency response from about 870 MHz to 920 MHz, electrically connecting an electronic circuit straddling the gap and arranged to receive the RF signal from the planar two arm spiral antenna, and sensing the receipt of the RF signal by the electronic circuit by sensing a power increase in the RF generator in the presence of the planar two arm spiral structure.

13. The method of claim 12 further comprising the steps of:

forming each arm of the planar two arm spiral structure identically to the other except, and rotating one arm in the plane by 180 degrees from the other.

14. The method of claim 12 further comprising the steps of:

defining a center at the middle of the gap, and forming each arm of the planar two spiral structure with an inner radial spiral and an outer radial spiral, and arranging the width of each arm to grow as the arms radiate farther from the center.

15. The method of claim 14 wherein the step of forming each arm comprises the step of using a logarithmic function to form inner and outer radial spirals.

16. The method of claim 14 further comprising the step of forming each arm such that at any point equidistant from the center the widths of each arm are equal to each other and equal to the spaces between each arm.

17. The method of claim 12 further comprising the step of forming a lateral dimensions of the planar two spiral arm structure that are less than about five inches by less than about two inches.

18. The method of claim 12 further comprising the step of forming a lateral dimensions of the planar two spiral arm structure that are less than about two inches by less than about one inches.

19. The method of claim 12 further comprising the step of forming each arm of the planar two arm spiral structure with a thin conductive layer built onto a substrate.

20. The method of claim 12 further comprising the steps of:

providing a network that matches the spiral antenna electrical impedance and that receives the RF signal from the planar two arm spiral antenna and provides an RF output signal, and providing an input circuit that receives and rectifies the RF output signal forming a DC signal, the input circuit including a capacitor that stores energy from the DC signal.

21. The method claim 20 further comprising the steps of:

building each arm of the planar two arm spiral structure with a thin conductive layer built onto a substrate, and building the network and the input circuit onto the substrate.

22. The method claim 21 further comprising the steps of:

mounting the input circuitry built onto a second substrate, and making electrical connections from the matching network to the input circuit.

* * * * *